(12) United States Patent
Chew

(10) Patent No.: US 6,636,383 B1
(45) Date of Patent: Oct. 21, 2003

(54) DISK DRIVE ACTUATOR ARM ASSEMBLY WITH UNITARY FLEX CABLE

(75) Inventor: David W. Chew, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 273 days.

(21) Appl. No.: 09/811,347

(22) Filed: Mar. 16, 2001

Related U.S. Application Data

(60) Provisional application No. 60/190,163, filed on Mar. 17, 2000.

(51) Int. Cl.[7] .......................... G11B 21/16; G11B 5/48
(52) U.S. Cl. ..................................................... 360/245.9
(58) Field of Search ................................ 360/244, 240, 360/245.8, 245.9, 244.1, 234.4

(56) References Cited

U.S. PATENT DOCUMENTS

| | | | | |
|---|---|---|---|---|
| 5,130,874 A | * | 7/1992 | Watrous | 360/266.3 |
| 5,375,021 A | | 12/1994 | Boeckner | 360/97.01 |
| 5,655,285 A | | 8/1997 | Bonn et al. | 29/603.03 |
| 5,859,749 A | * | 1/1999 | Zarouri et al. | 360/245.9 |
| 5,953,183 A | | 9/1999 | Butler et al. | 360/264.2 |
| 6,134,075 A | | 10/2000 | Bennin et al. | 360/245.9 |
| 6,169,643 B1 | * | 1/2001 | Iwamoto | 360/245.9 |
| 6,278,585 B1 | * | 8/2001 | Olson et al. | 360/264.2 |

FOREIGN PATENT DOCUMENTS

JP 3-35482 A * 2/1991

* cited by examiner

*Primary Examiner*—Julie Anne Watko
(74) *Attorney, Agent, or Firm*—Marsh Fischmann & Breyfogle LLP

(57) ABSTRACT

An actuator arm assembly for a disk drive is disclosed. The actuator arm assembly includes at least two actuator arms, each having a corresponding suspension and read/write head. A one-piece flex cable is attached to the upper or lower surface of each of these actuator arms, and includes at least one preamp. The flex cable provides an electrical interconnection between the read/write heads of these two actuator arms and a drive electronics board. Both of these actuator arms may be detachably interconnected with a spacer via at least one snap-lock type interconnection to allow for a "no tools" assembly/disassembly of the actuator arm assembly.

17 Claims, 5 Drawing Sheets

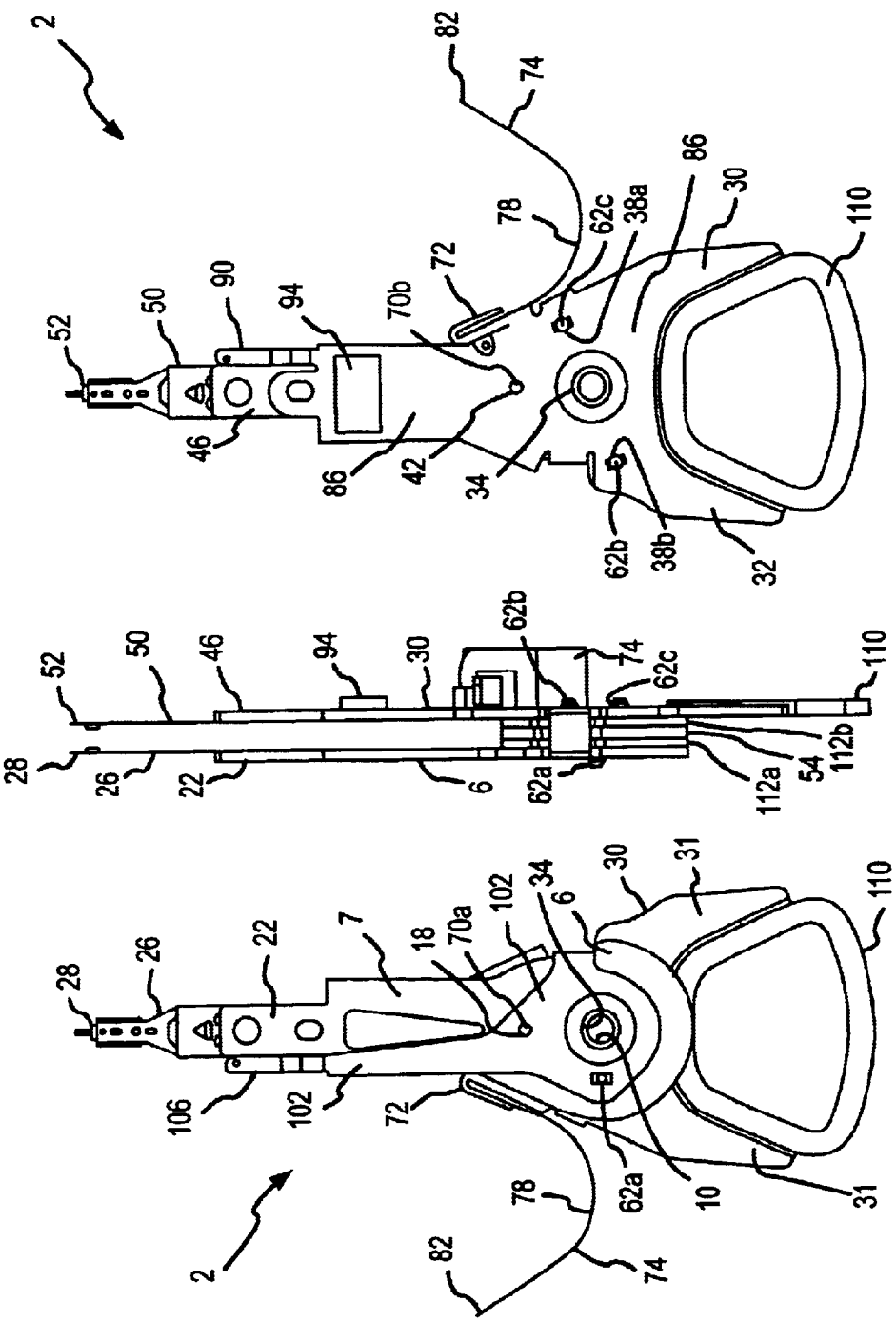

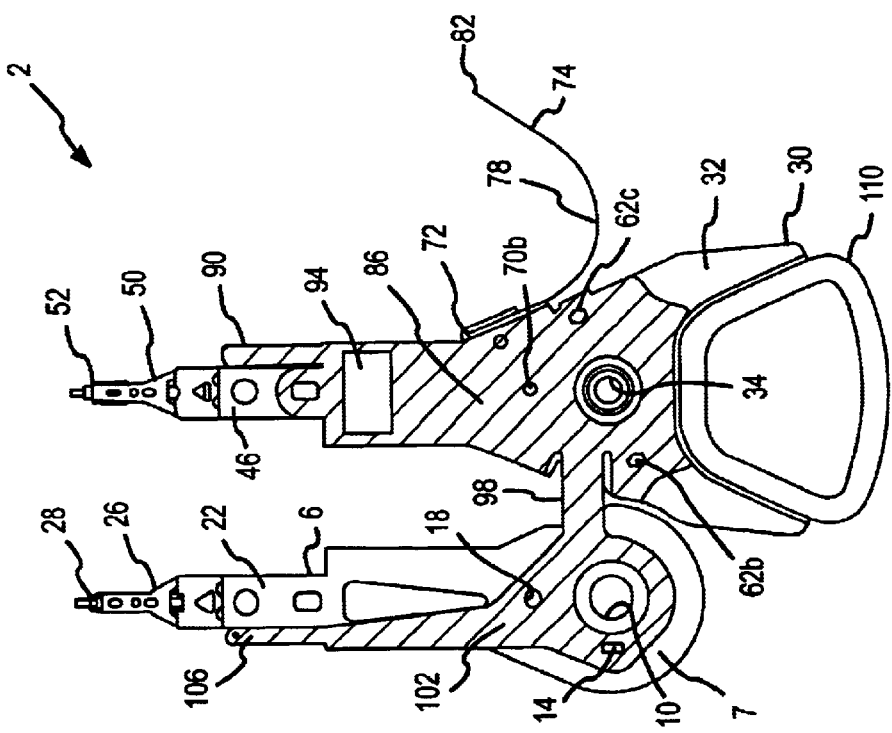
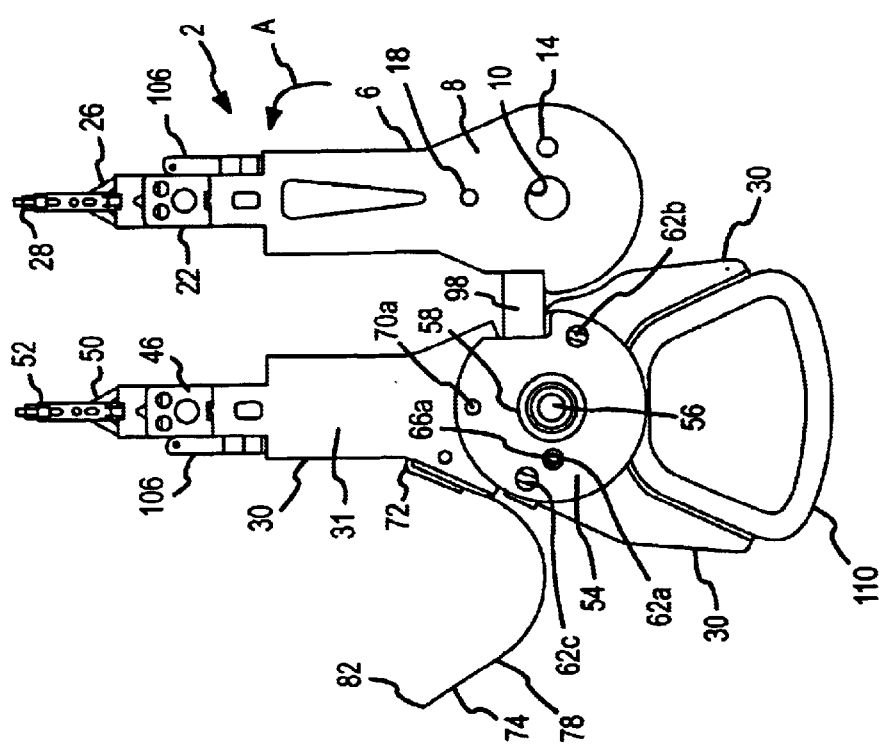

DISK DRIVE ACTUATOR ARM ASSEMBLY WITH UNITARY FLEX CABLE

CROSS-REFERENCE TO RELATED APPLICATIONS

This utility patent application claims priority from and is based upon U.S. Provisional Patent Application Ser. No. 60/190,163, which was filed on Mar. 17, 2000, which is entitled "ACTIVATOR FOR TWO-HEADED DISK DRIVES WITH CANTILEVERED PIVOT AND SINGLE LAMINATED. FLEX CABLE INTEGRATING ELECTRONIC FUNCTIONS," and the entire disclosure of which is hereby incorporated by reference in its entirety herein.

FIELD OF THE INVENTION

The present invention generally relates to the field of computer disk drives and, more particularly, to an actuator arm assembly for a disk drive that includes a pair of actuator arms whose read/write heads are each electrically interconnected with one-piece flex cable that is attached to each of these actuator arms.

BACKGROUND OF THE INVENTION

There is continuing pressure to reduce the cost of disk drives for computers. One way to reduce disk drive costs is through design simplification of one or more of the main disk drive assemblies. Design simplification may not only reduce material costs and/or production costs, but it may provide desired enhancements to the assembly of the various disk drive components as well which will also tend to reduce the overall cost. Designs which reduce the amount of time required to disassemble a particular disk drive assembly for some type of reworking are also particularly desirable.

BRIEF SUMMARY OF THE INVENTION

A first aspect of the present invention generally relates to an actuator arm assembly for a disk drive. The actuator arm assembly includes at least two actuator arms that each have an upper and lower surface. Hereafter, this will be referred to as first and second actuator arms. Each actuator arm has a suspension that is appropriately attached to its corresponding actuator arm and extends away therefrom. A transducer (e.g., a read/write head) is appropriately mounted on each suspension for exchanging signals with an appropriate computer-readable storage medium (e.g., a hard disk). These two actuator arms and attached components define or are part of an actuator arm stack.

Another component of the actuator arm assembly of the subject first aspect is a flex cable that allows the transducers of the first and second actuator arms to be electrically interconnected with a drive electronics board in a disk drive which may incorporate the actuator arm assembly of the subject first aspect. This flex cable includes first, second, and third flex cable sections. The first flex cable section is attached to the upper surface the first actuator arm and is electrically interconnected with its corresponding transducer. The second flex cable section is attached to the lower surface of the second actuator arm and is electrically interconnected with its corresponding transducer. Finally, the third flex cable section extends between and electrically interconnects the first and second flex cable sections. Notwithstanding this characterization of the flex cable being in multiple sections, the flex cable is in fact integrally formed. The third flex cable section is integrally formed with each of the first and second flex cable sections such that there is no mechanical joint between the first and third flex cable sections, and further such that there is no mechanical joint between the second and third flex cable sections. No soldered connection or the like exists between the first and third flex cable sections, nor between the second and third flex cable sections, to provide the desired electrical interconnection.

Various refinements exist of the features noted in relation to the subject first aspect of the present invention. Further features may also be incorporated in the subject first aspect of the present invention as well. These refinements and additional features may exist individually or in any combination. Both of the first and second actuator arms in the case of the first aspect may be formed by a stamping operation in which at least one and more typically a plurality of actuator arms are stamped from a common sheet of material. The sheet of material may be a laminate or instead may be single piece of material. In any case, the first and second actuator arms may be characterized as stamped components. Another characterization that may be made in relation to the first and second actuator arms of the subject first aspect is that they may be thin structures with planar upper and lower surfaces.

The flex cable associated with the first aspect allows appropriate electrical signals to be sent to and directed from the transducers that are associated with the first and second actuator arms. In one embodiment, at least one preamp is integrally formed with the flex cable. That is, there are no soldered connections or the like between electrical lines/traces and the preamp(s). In another embodiment, the first flex cable section that is attached to the upper surface of the first actuator arm includes a preamp. Having a preamp disposed on an actuator arm reduces the distance between the preamp and at least one transducer, that in turn enhances one or more performance characteristics of the actuator arm assembly.

The electrical interconnection of the flex cable of the first aspect to the noted electronics board may be established by a fourth flex cable section of the flex cable. In this regard, the fourth flex cable section may extend away from either the first or second flex cable section (and thereby away from the first or second actuator arm), and may include a free end that defines an electrical connector (e.g., a pin connector). Once again, the flex cable is integrally formed or of one-piece construction. Therefore, there is no mechanical joint between the fourth flex cable connection and the first or second flex cable section to which the fourth flex cable section interconnects, and including between electrical lines/traces that are on the fourth flex cable section and the corresponding lines/traces that are on the first/second flex cable section.

One way to make the flex cable used by. the subject first aspect is to form an electrical interconnect bus on a common sheet of material that routes one or more electrical interconnect lines or traces in a desired/required pattern. For instance, a film or layer of an appropriate electrically conductive material (e.g., copper) may be deposited or otherwise formed upon a plastic film or other appropriate material (e.g., flexible/pliable), and then patterned to define the desired electrical interconnect bus. It should be appreciated that there would then be no soldered connection or the like between any electrical lines or traces of this electrical interconnect bus throughout the entirety of the flex cable. In any case, this assembly of sorts may then be cut or stamped so as to encompass the entirety of the electrical interconnect bus, and further so as to provide an appropriate configuration for interfacing with the first and second actuator arms, the interconnection therebetween, and for interconnection with the drive electronics board.

The actuator arm assembly of the first aspect may also include a spacer on which each of the first and second actuator arms may be mounted. In one embodiment, this spacer is plastic. Both the first and second actuator arms may include a hole that may be disposed over a hub or the like of the spacer. The spacer would typically include a pair of hubs that extend at least generally away from each other or in opposite directions so that the first and second actuator arms are disposed in spaced relation on opposite sides of the spacer. Features may be incorporated on one or more of the actuator arms and the spacer to interconnect the actuator arms with this spacer, to dispose the actuator arms in a predetermined radial position on the spacer, or both. Preferably, the spacer includes at least one attachment pin and at least one alignment pin for interfacing with the first actuator arm, and at least one attachment pin and at least one alignment pin for interfacing with the second actuator arm. In one embodiment, the attachment pins used by the spacer allow the first and second actuator arms to be detachably interconnected therewith, for instance by including an enlarged head on an attachment pin which is directed entirely through an aligned attachment pin hole on the corresponding actuator arm. In one embodiment, the alignment pins associated with the spacer dispose both the first and second actuator arms on the spacer in a predetermined radial position. One way in which this may be affected is by having a "tighter" fit between the alignment pin(s) and its corresponding hole on the first or second actuator arm than exists between attachment pins used by the spacer and their corresponding hole on the first and second actuator arm in the fully assembled condition (e.g., after having passed the enlarged head of the attachment pin entirely through its corresponding attachment pin hole).

A second aspect of the present invention also generally relates to an actuator arm assembly for a disk drive. The actuator arm assembly includes a first actuator arm that has upper and lower surfaces. A first suspension is appropriately attached to the first actuator arm and extends therefrom. A first transducer (e.g., a read/write head) is appropriately mounted on the first suspension for exchanging signals with an appropriate computer-readable storage medium (e.g., a hard disk). The actuator assembly of the second aspect further includes a flex cable that allows the first transducer to be electrically interconnected with a drive electronics board in a disk drive which may incorporate this actuator arm assembly of the second aspect. In this regard, the flex cable includes a first flex cable section that is attached to either the upper or lower surface of the first actuator arm, and further that is electrically interconnected with the first transducer.

Various refinements exist of the features noted in relation to the subject second aspect of the present invention. Further features may also be incorporated in the subject second aspect of the present invention as well. These refinements and additional features may exist individually or in any combination. In one embodiment, the flex cable of the second aspect, and including the first flex cable section, is in the form of a sheet or sheet-like structure. The flex cable associated with second aspect may also incorporate those features of the flex cable discussed above in relation to the first aspect of the present invention.

A third aspect of the present invention also generally relates to an actuator arm assembly for a disk drive. The actuator arm assembly includes a first actuator arm that has upper and lower surfaces. A first suspension is appropriately attached to the first actuator arm and extends therefrom. A first transducer (e.g., a read/write head) is appropriately mounted on the first suspension for exchanging signals with an appropriate computer-readable storage medium (e.g., a hard disk). The actuator assembly of the second aspect further includes a flex cable that allows the first transducer to be electrically interconnected with a drive electronics board in a disk drive which may incorporate this actuator arm assembly. A preamp is integrally formed with this flex cable, and the flex cable is electrically interconnected with the first transducer. In one embodiment, this preamp is disposed on an upper or lower surface of the first actuator arm.

A fourth aspect of the present invention also generally relates to an actuator arm assembly for a disk drive. The actuator arm assembly includes first and second actuator arms. A first suspension is appropriately attached to the first actuator arm, extends away from the first actuator arm, and has a first transducer (e.g., a read/write head) appropriately mounted thereto for exchanging signals with an appropriate computer-readable storage medium (e.g., a hard disk) when the actuator arm assembly of the fourth aspect is incorporated into a disk drive. Similarly, a second suspension is appropriately attached to the second actuator arm, extends away from the second actuator arm, and has a second transducer (e.g., a read/write head) appropriately. mounted thereto for exchanging signals with an appropriate computer-readable storage medium (e.g., a hard disk) when the actuator arm assembly of the fourth aspect is incorporated into a disk drive. Both the first and second actuator arms are detachably interconnected with a spacer via a snap-lock interconnection.

Various refinements exist of the features noted in relation to the subject fourth aspect of the present invention. Further features may also be incorporated in the subject fourth aspect of the present invention as well. These refinements and additional features may exist individually or in any combination. The snap-lock interconnection between the spacer and each of the first and second actuator arms may be provided by one or more attachment pins having an enlarged head that extend completely through an appropriately positioned hole on the corresponding actuator arm. These heads may have a larger diameter than their corresponding attachment pin hole such that the same must be forced therethrough to assemble/disassemble the corresponding actuator arm and spacer.

The above-noted attachment pins that may be utilized by the subject fourth aspect will at least somewhat position the corresponding actuator arm on the spacer in a certain radial position prior to attaching the actuator arm assembly to a pivot bearing or the like of a disk drive that incorporates such an actuator arm assembly. A more precise establishment of a predetermined radial position between the spacer and each of the first and second actuator arms may be established/fixed by using one or more alignment pins. One way to characterize these alignment pins is that the same are structurally different than the above-noted attachment pins. In one embodiment, the alignment pins are of a solid, cylindrical configuration. Another way to characterize these alignment pins is that there is a "tighter" fit or smaller clearance between each alignment pin and its corresponding hole on the first or second actuator arm, than between the above-noted attachment pins and their corresponding hole on the first or second actuator arm in the fully assembled configuration (i.e., after having forced the enlarged head of the attachment pin through the corresponding hole in the actuator arm).

BRIEF DESCRIPTION OF THE SEVERAL VIEWS OF THE DRAWING

FIG. 3 is a top view of the actuator arm assembly of FIG. 1.

FIG. 4 is the bottom view of the actuator arm assembly of FIG. 1.

FIG. 5 is a side view of the actuator arm assembly of FIG. 1.

FIG. 6 is a plan view of the actuator arm assembly of FIG. 1 in a disassembled configuration and to show those surfaces of the actuator arms that are opposite those surfaces on which the one-piece flex cable is mounted.

FIG. 7 is a plan view of the actuator arm assembly of FIG. 1 in a disassembled configuration and to show those surfaces of the actuator arms on which the one-piece flex cable is mounted.

DETAILED DESCRIPTION OF THE INVENTION

Figure 1:
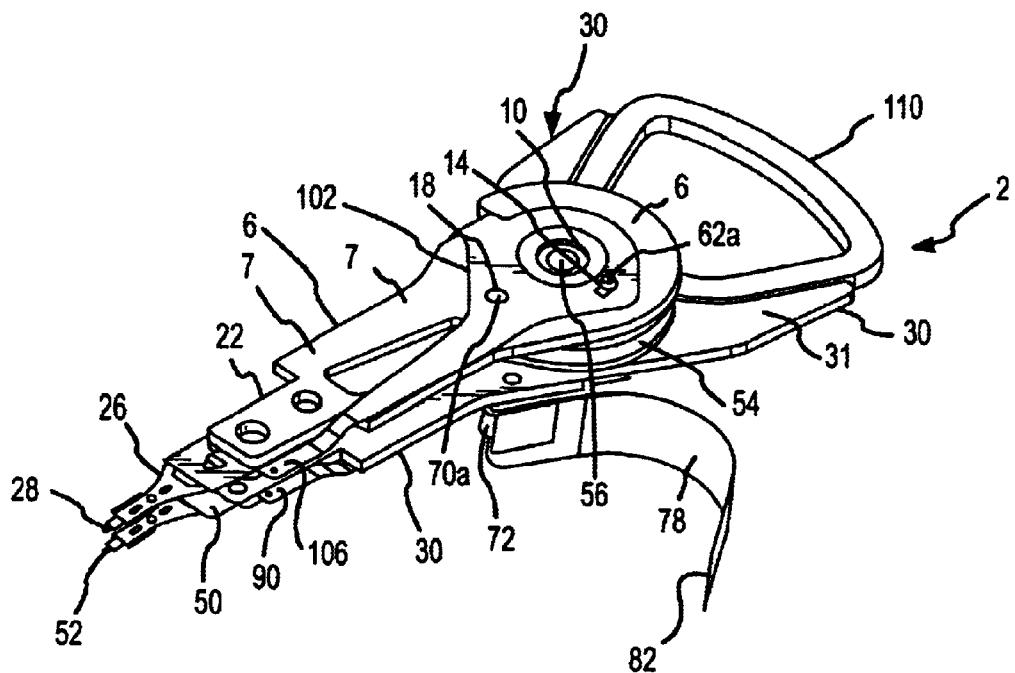
FIG. 1 is a perspective view of an upper portion of one embodiment of an actuator arm assembly with a one-piece flex cable.
Figure 2:
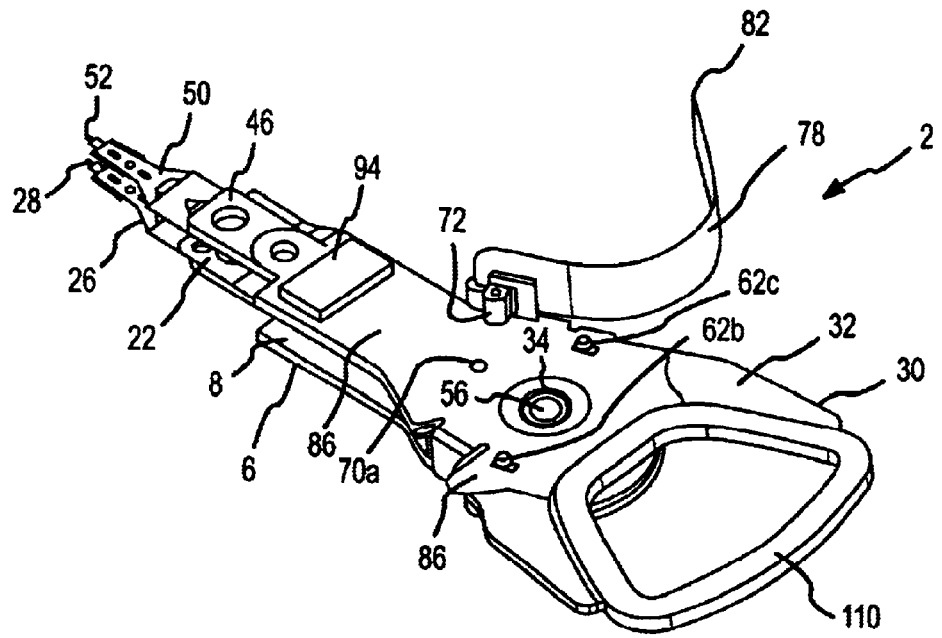
FIG. 2 is a perspective view of a lower portion of the actuator arm assembly presented in FIG. 1.

The present invention will now be described in relation to the accompanying drawings which at least assist in illustrating its various pertinent features. FIGS. 1–7 present various views of one embodiment of an actuator assembly 2. The actuator arm assembly 2 generally includes an upper actuator arm 6 and a lower actuator arm 30 that are mounted on a spacer 54 in vertically spaced relation to each other. The actuator arm assembly 2 is pivotally interconnected with an appropriate bearing assembly that is associated with an appropriate support structure (e.g., base plate) of a disk drive to allow the actuator arm assembly 2 to pivot/move in a desired manner to read/write information from/to an appropriate computer-readable storage medium (e.g., one or more hard disks).

The upper actuator arm 2 is a relatively thin structure having two primary surfaces, namely a planar upper surface 7 and a planar lower surface 8. One way to make the upper actuator arm 2 is through a stamping operation or the like. As such, the upper actuator arm 2 may be referred to as a stamped component. Multiple sheets of materials may be laminated together to define the upper actuator arm 2 in the form of a laminated structure (e.g., a pair of sheets of aluminum that are joined by an appropriate adhesive that may also function as a vibration damper), and thereafter an upper actuator arm 6 of the desired configuration may be stamped therefrom. However, the upper actuator arm 2 could also be made from a single piece of material in the desired "thin" configuration.

The upper actuator arm 6 includes a mounting hole 10 that extends entirely through the upper actuator arm 6. Generally, the mounting hole 10 provides for mounting the upper actuator arm 6 on the spacer 54, as well as for pivotally interconnecting the actuator arm assembly 2 with the above-noted bearing assembly to in turn allow the actuator arm assembly 2 to move relative to the disk drive support structure. In this regard, the mounting hole 10 is at least generally vertically aligned with a pivot bearing mounting hole 56 in the spacer 54, although the same may be of slightly different diameters (e.g., in concentric relation). At least one snap-lock hole 14 and at least one alignment hole 18 also extend entirely through the upper actuator arm 6 for establishing a desired interconnection/alignment with the spacer 54 in a manner that will be discussed in more detail below.

The upper actuator arm 6 also includes a tip 22 on which an upper suspension 26 is mounted (e.g., via a staking or welding operation). The upper suspension 26 cantilevers or extends away from the upper actuator arm 6 and includes a transducer or an upper read/write head 28 on its free end. Any way of interconnecting the upper read/write head 28 with the upper suspension 26 may be utilized. Signals are exchanged between this upper read/write head 28 and an appropriate computer-readable data storage medium (e.g., a disk) to write information to and/or read information from this computer-readable data storage medium. Movement of the actuator arm assembly 2 relative to the disk drive base plate moves the upper read/write head 28 to the desired radial location of its corresponding computer-readable data storage medium to provide the read/write function.

The lower actuator arm 30 is also a relatively thin structure having two primary surfaces, namely a planar upper surface 31 and a planar-lower surface 32. One way to make the lower actuator arm 30 is through a stamping operation or the like. As such, the lower actuator arm 30 may be referred to as a stamped component. Multiple sheets of materials may be laminated together to define the lower actuator arm 30 in the form of a laminated structure (e.g., a pair of sheets of aluminum that are joined by an appropriate adhesive that may also function as a vibration damper), and thereafter a lower actuator arm 30 of the desired configuration may be stamped therefrom. However, the lower actuator arm 30 could also be made from a single piece of material in the desired "thin" configuration.

The lower actuator arm 30 includes a mounting hole 34 that extends entirely through the lower actuator arm 30. Generally, the mounting hole 34 provides for mounting the lower actuator arm 30 on the spacer 54, as well as for pivotally interconnecting the actuator arm assembly 2 with the above-noted bearing assembly to in turn allow the actuator arm assembly 2 to move relative to the disk drive support structure. In this regard, the mounting hole 34 is at is least generally vertically aligned with the pivot bearing mounting hole 56 in the spacer 54, although the same may be of slightly different diameters (e.g., in concentric relation). At least one snap-lock hole 38 and at least one alignment hole 42 also extend entirely through the lower actuator arm 30 for establishing a desired interconnection/alignment with the spacer 54 in a manner that will be discussed in more detail below.

The lower actuator arm 30 also includes a tip 46 on which a lower suspension 50 is mounted (e.g., via a staking or welding operation). The lower suspension 50 cantilevers or extends away from the lower actuator arm 30 and includes a transducer or lower read/write head 52 on its free end. Any way of interconnecting the lower read/write head 52 may be utilized (e.g., a gimbaled connection). Signals are exchanged between this lower read/write head 52 and an appropriate computer-readable data storage medium (e.g., a disk) to write information to and/or read information from this computer-readable data storage medium. Movement of the actuator arm assembly 2 relative to the disk drive base plate moves the lower read/write head 52 (simultaneously with the upper read/write head 28) to the desired radial location of its corresponding computer-readable data storage medium. Controlled movement of the actuator arm assembly 2 is provided at least in part by a coil 110 that is appropriately secured to the lower actuator arm 30, and which is part of a voice coil motor or the like for the disk drive that incorporates the actuator arm assembly 2.

Both the upper read/write head 28 and the lower read/write head 52 are electrically interconnected with a drive electronics board or the like (not shown) by a one-piece or integrally formed flex cable 74 (FIGS. 1–8). Generally, the flex cable 74 is attached to both the upper actuator arm 6 and the lower actuator arm 30. There is no joint or the like in the flex cable 74 to establish a connection with the upper actuator arm 6 or the lower actuator arm 30. Similarly, there is no joint or the like in the flex cable 74 to establish an interconnection between the lower actuator arm 30 and the upper actuator arm 6. However, it should be appreciated that the thickness of the flex cable 74 may include one or more joints, such as by utilizing a laminated construction for the flex cable 74.

The flex cable 74 includes a drive electronics board interconnect section 78 having a connector 82 (e.g., a pin connector) on a free end thereof for establishing an electrical interconnection between the flex cable and the drive electronics board (not shown). Another part of the flex cable 74 is a lower actuator arm section 86. The lower actuator arm section 86 is appropriately attached (e.g., via an adhesive) to the lower surface 32 of the lower actuator arm 30 and includes a lower head interconnect section 90 for establishing an electrical interconnection with the lower read/write head 52. In one embodiment, the lower head interconnect section 90 includes a plurality of pads that interface with legs of an integrated circuit chip that attach to one or more of these pads.

A preamp 94 is also included in the lower actuator arm section 86 of the flex cable 74. Therefore, it is proper to characterize the preamp 94 as being mounted on the lower actuator arm 30. Another way to characterize the preamp 94 is that it is integrated into both the physical and electrical structure of the flex cable 74. Only a single preamp 94 is used for both the upper read/write head 28 and the lower read/write head 52 in the illustrated embodiment, such that the preamp 94 may be characterized as a two channel preamp. Each read/write head 28, 52 could also have its own separate preamp, in which case two preamps could be integrated with the flex cable 74 so as to dispose one preamp on the upper actuator arm 6 and so as to dispose another preamp on the lower actuator arm 30 (not shown).

The flex cable 74 also includes an upper actuator arm section 102, which is interconnected with the lower actuator arm section 86 by an actuator arm interconnect section 98 of the flex cable 74. The upper actuator arm section 102 is appropriately attached to the upper surface 7 of the upper actuator arm 6 (e.g., via an adhesive) and includes an upper head interconnect section 106 for establishing an electrical interconnection with the upper read/write head 20. In one embodiment, the upper head interconnect section 106 includes a plurality of pads that interface with legs of an integrated circuit chip that attach to one or more of these pads.

Although the flex cable 74 has been described in relation to the above-noted individual sections, once again, the flex cable 74 is one-piece or a single, autonomous unit. That is, the flex cable 74 does not include any mechanical interconnection or joint between the electronics board interconnect section 78 and the lower actuator arm section 86, between the lower actuator arm section 86 and the actuator arm interconnect section 98, or between the actuator arm interconnect section 98 and the upper actuator arm section 102.

Figure 8:
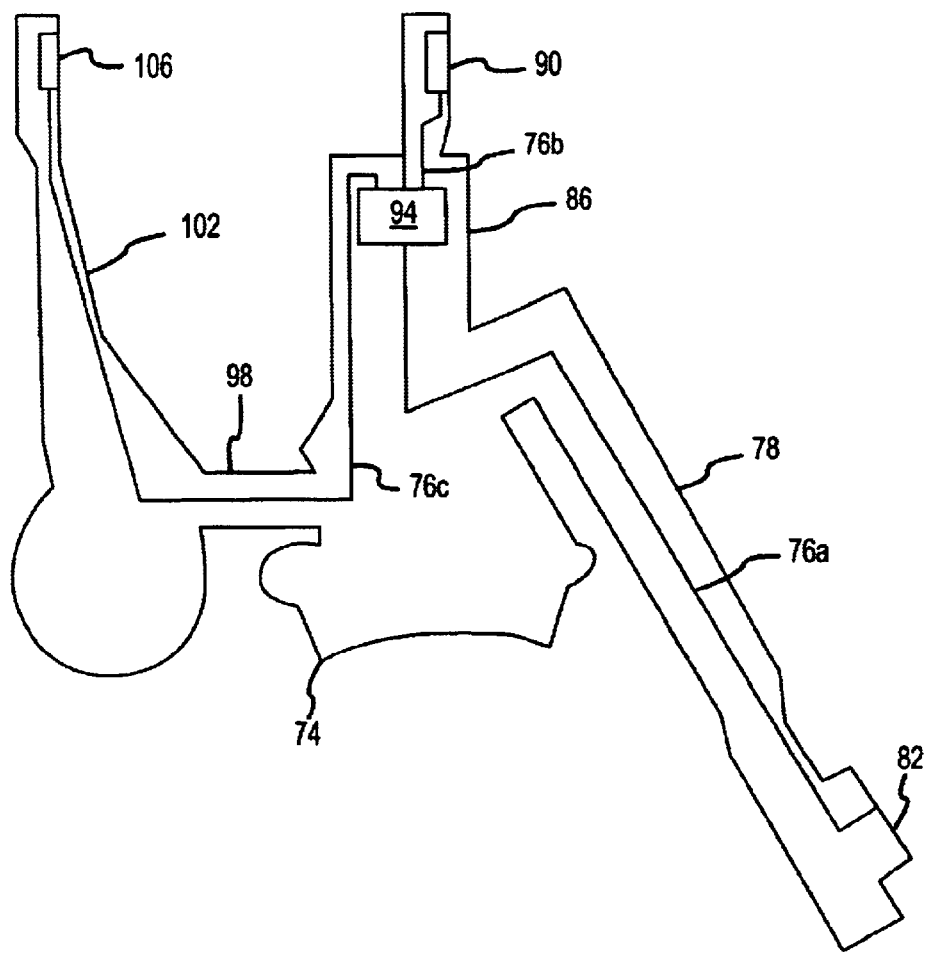
FIG. 8 is a plan view of the one-piece flex cable used by the actuator arm assembly of FIG. 1 and which schematically represents the electrical components included thereon.

Signals are routed to/from the upper read/write head 28 and/or the lower read/write head is, 52 by an electrical interconnect line or trace bus 76 that is formed on the flex cable 74. The electrical interconnect or trace bus 76 is schematically illustrated in FIG. 8, and would include a plurality of individual electrical interconnect lines or traces (not shown). A first bus section 76 extends between the connector 82 of the flex cable 74 and the preamp 94, a second bus section 76b extends between the preamp 94 and the lower head interconnect section 90, and a third bus section 76c extends between the preamp 94 and the upper head interconnect section 106. Each of these sections would typically include a plurality of electrical interconnect lines or traces. Notably, each of these. electrical interconnect lines or traces are continuous in that there are no soldered connections or the like within the structure of the flex cable 74.

One way in which the various individual electrical interconnects or traces of the bus 76 may be formed is by laminating or otherwise depositing/forming an appropriate electrically conductive material (e.g., copper) on a sheet of an appropriate material (e.g., a plastic), patterning this electrically conductive material layer to define the desired electrical interconnect or trace bus 76 (e.g., a masking, etching, and mask removal operation), and thereafter possibly depositing one or more additional thin films or layers over the electrical interconnect or trace bus 76 (e.g., to encapsulate the bus 76). Any appropriate way of making the flex cable 74 with the electrical interconnect line or trace bus 76 may be utilized. In one embodiment, the flex cable 74 is relatively thin and sufficiently flexible or pliable so as to allow the actuator arm assembly 2 to be assembled in the following manner (e.g., to allow the actuator arm interconnect section 98 to bend or fold during the mounting of the upper actuator arm 2 and the lower actuator arm 30 on the spacer 54).

Figure 9:
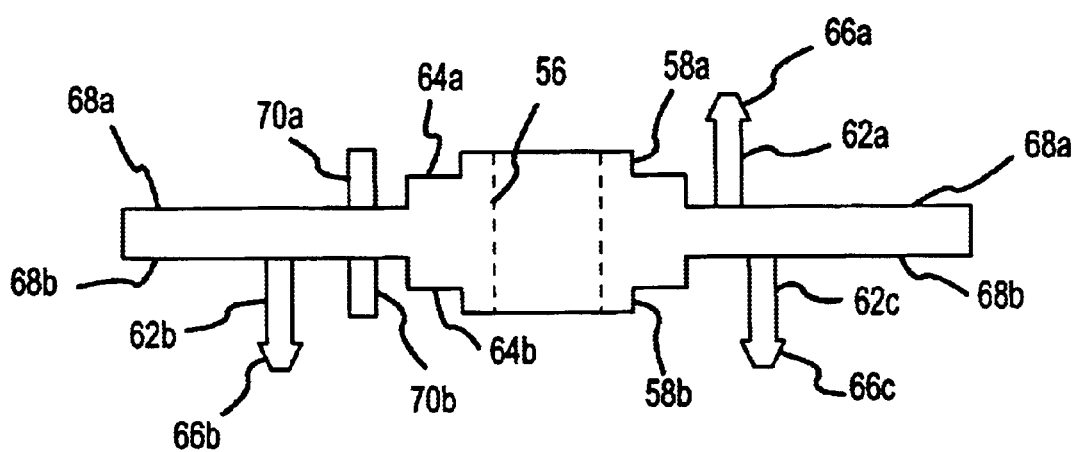
FIG. 9 is an enlarged side view of the spacer used by the actuator arm assembly of FIG. 1.

The flex cable 74 establishes one type of interconnection between the upper actuator arm 6 and the lower actuator arm 30. This interconnection is more for electrical purposes than structural purposes. Another interconnection between the upper actuator arm 6 and the lower actuator arm 30 that is more structurally oriented is provided by the spacer 54. The spacer 54 generally includes an upper hub 58a that is disposed within the mounting hole 10 of the upper actuator arm 6 such that an annular portion of the lower surface 8 of the upper actuator arm 6 interfaces with a shoulder 64a of the spacer 54 (FIG. 9). A vibration damper 112a made of an appropriate material may be disposed between the shoulder 64a and the upper actuator arm 6, although such is not required (FIG. 5). Other portions of the lower surface 8 of the upper actuator arm are thereby spaced from a surface 68a of the spacer 54. Similarly, the spacer 54 also includes a lower hub 58b that is disposed within the mounting hole 34 of the lower actuator arm 30 such that an annular portion of the lower surface 32 of the lower actuator arm 30 interfaces with a shoulder 64b of the spacer 54 (FIG. 8). Another vibration damper 112b may be disposed between the shoulder 64b and the lower actuator arm 30, although such is not required (FIG. 5). Other portions of the upper surface 31 of the lower actuator arm are thereby spaced from a surface 68b of the spacer 54. Typically, the outer diameter of the upper-hub 58a will at least generally match the diameter of the mounting hole 10 on the upper actuator arm 6, while the outer diameter of the lower hub 58b will at least generally match the diameter of the mounting hole 34 on the lower actuator arm 30. Although a friction or press fit interconnection could be utilized between the spacer 54 and each of the upper actuator arm 6 and lower actuator arm 30 via the hubs 58a, 58b, respectively, such is not required.

The spacer 54 includes a pivot bearing mounting hole 56 that allows for attachment of the actuator arm assembly 2 to a pivot bearing of the above-noted type (e.g., by passing a screw or the like within/through the pivot bearing mounting hole 56 to engage a portion of the pivot bearing that may extend upwardly within the pivot bearing mounting hole 56). In one embodiment, the mounting hole 10 of the upper actuator arm 6, the mounting hole 34 of the lower actuator arm 30, and the pivot bearing mounting hole 56 of the spacer 54 are concentrically position or vertically aligned (i.e., with a common center axis about which the same are disposed).

The spacer 54 includes a plurality of snap-lock pins 62 with enlarged heads 66 and a plurality of alignment pins 70. The snap-lock pin 62a extends at least generally upwardly from the upper surface 68a of the spacer 54 through the snap-lock hole 14 in the upper actuator arm 6 so as to dispose the head 66a above the upper surface 7 of the upper actuator arm 6. The head 66a has a larger diameter than the snap-lock hole 14 such that the same must be forced through the hole 14 both to assemble and disassemble the actuator arm assembly 2. The alignment pin 70a also extends at least generally upwardly from the upper surface 68a of the spacer 54 at least within the alignment hole 18 in the upper actuator arm 6 (i.e., the alignment pin 70a need not extend entirely through the upper actuator arm 6 to provide its alignment function). There is a "tighter" or more snug fit between the alignment pin 70a and its corresponding alignment hole 18 (e.g., less clearance) than between the snap-lock pin 62a and the snap-lock hole 14 in the fully assembled configuration (with the head 66a having already been forced through the snap-lock hole 14), such that the alignment pin 70a more effectively retains the upper actuator arm 6 in a desired radial position relative to the spacer 54. Relative vertical movement between the upper actuator arm 6 and the spacer 54 is limited by the detachable interconnection provided by the snap-lock pin 62a. Other ways of detachably interconnecting the upper actuator arm 6 to the spacer 54 could be utilized, including using more than one snap-lock pin 62 to detachably interconnect the upper actuator arm 6 with the spacer 54. However, the illustrated embodiment requires no tools to detachably interconnect the upper actuator arm 6 with the spacer 54, and thereby provides one or more enhancements to the assembly of a disk drive that utilizes the actuator arm assembly 2.

The snap-lock pin 62b extends at least generally downwardly from the lower surface 68b of the spacer 54 through the snap-lock hole 38b in the lower actuator arm 30 so as to dispose the head 66b below the lower surface 32 of the lower actuator arm 30. The head 66b has a larger diameter than the snap-lock hole 38b such that the same must be forced through the hole 38b both to assemble and disassemble the actuator arm assembly 2. The snap-lock pin 62c extends at least generally downwardly from the lower surface 68b of the spacer 54 through the snap-lock hole 38a in the lower actuator arm 30 so as to dispose the head 66c below the lower surface 32 of the lower actuator arm 30. The head 66c has a larger diameter than the snap-lock hole 38a such that the same must be forced through the hole 38a both to assemble and disassemble the actuator arm assembly 2. The alignment pin 70b also extends at least generally downwardly from the lower surface 68b of the spacer 54 at least within the alignment hole 42 in the lower actuator arm 30 (i.e., the alignment pin 70b need not extend entirely through the lower actuator arm 30 to provide its alignment function). There is a "tighter" or more snug fit between the alignment pin 70b and its corresponding alignment hole 42 (e.g., less clearance) than between the snap-lock pin 62b, 62c and their corresponding snap-lock hole 38b, 38a, respectively, in the fully assembled configuration, such that the alignment pin 70b more effectively retains the lower actuator arm 30 in the desired radial position relative to the spacer 54. Relative vertical movement between the lower actuator arm 30 and the spacer 54 is limited by the detachable interconnection provided by the snap-lock pins 62b, 62c. Other ways of detachably interconnecting the lower actuator arm 30 to the spacer 54 could be utilized, including using one or more snap-lock pin 62 to detachably interconnect the lower actuator arm 30 with the space 54. However, the illustrated embodiment requires no tools to detachably interconnect the lower actuator arm 30 with the spacer 54, and thereby provides one or more enhancements to the assembly of a disk drive that utilizes the actuator arm assembly 2.

It should be appreciated that the above-described construction of the actuator arm assembly 2 is not only a simple way of assembling the actuator arm assembly 2, but allows for easy disassembly of the same for any reworking that may be required. The flex cable 74 again will be appropriately attached to the lower surface 32 of the lower actuator arm 30 and the upper surface 7 of the upper actuator arm 6. One of the upper actuator arm 6 and the lower actuator arm 30 may then be mounted on the spacer 54. In the illustrated embodiment, this again entails lining up one or more snap-lock pins 62 with a corresponding snap-lock hole on an actuator arm and forcing the corresponding head 66 therethrough, while radially aligning the subject actuator arm relative to the spacer 54 by aligning one or more alignment pins 70 with a corresponding alignment hole on the corresponding actuator arm. The flex cable 74 may then be "folded" so as to dispose the other of the upper actuator arm 6 and the lower actuator arm 30 in position so as to be able to mount the same on the spacer 54 as well in this same general manner. Typically this will not "crease" the actuator arm interconnect section 98, but instead will dispose the same into an at least generally arcuate configuration. An example of this type of "folding" of the flex cable 74 to assemble the actuator arm assembly is depicted in FIG. 6. In the view presented in FIG. 6 where the lower actuator arm 30 has already been mounted on the spacer 54 (which shows the "back side" of the snap-lock pins 62b, 62c), the upper actuator arm 6 may be rotated or pivoted at least generally in the direction of the arrow A so as to dispose the upper actuator arm 6 into position for detachably interconnecting the same with the spacer 54. In the event that any reworking of the actuator arm assembly 2 is required and which would require the upper actuator arm 6 and/or the lower actuator arm 30 to be removed from the spacer 54 after being assembled in the noted manner, the associated actuator arm may be pivoted or otherwise moved away from the spacer 54 so as to "pull" the enlarged head 86 of any interconnecting snap-lock pin 62 back through its corresponding hole in the corresponding actuator arm.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive actuator arm assembly, comprising:
    a first actuator arm comprising a first actuator arm upper surface and an oppositely disposed first actuator arm lower surface;
    a first suspension attached to and extending from said first actuator arm;
    a first transducer attached to said first suspension;
    a second actuator arm comprising a second actuator arm upper surface and an oppositely disposed second actuator arm lower surface, wherein said first and second actuator arms are disposed in spaced relation and are at least generally vertically aligned;
    a second suspension attached to and extending from said second actuator arm;
    a second transducer attached to said second suspension; and
    a flex cable that is electrically connectable with an electronics board and that comprises first, second, and third flex cable sections, wherein said first flex cable section is attached to said first actuator arm upper surface and is electrically interconnected with said first transducer, wherein said second flex cable section is attached to said second actuator arm lower surface and is electrically interconnected with said second transducer, and wherein said third flex cable section interconnects said first and second flex cable sections and is integrally formed with each of said first and second flex cable sections such that there is no mechanical joint between said first and third flex cable sections, and such that there is no mechanical joint between said second and third flex cable sections.

2. A disk drive actuator arm assembly, as claimed in claim 1, wherein:
    each of said first and second actuator arms are stamped components.

3. A disk drive actuator arm assembly, as claimed in claim 1, wherein:
    each of said first and second actuator arms are of a thin, planar configuration.

4. A disk drive actuator arm assembly, as claimed in claim 1, further comprising:
    a coil attached directly to one of said first and second actuator arms.

5. A disk drive actuator arm assembly, as claimed in claim 1, wherein:
    said first flex cable section comprises a preamp for both said first and second transducers.

6. A disk drive actuator arm assembly, as claimed in claim 1, wherein:
    said first flex cable section comprises a first preamp, wherein said first preamp is integrally formed with said first flex cable section.

7. A disk drive actuator arm assembly, as claimed in claim 1, wherein:
    said flex cable further comprises a fourth flex cable section, wherein said fourth flex cable section extends away from one of said first and second flex cable sections and comprises a free end, wherein said free end comprises an electrical connector, and wherein said fourth flex cable section is integrally formed with each of said first, second, and flex cable sections such that there is no mechanical joint between said fourth flex cable section and said one of said first and second flex cable sections.

8. A disk drive actuator arm assembly, as claimed in claim 7, wherein:
    said first, second, third, and fourth flex cable sections are formed on a common sheet of a flexible material with an electrical interconnect bus formed thereon for transferring signals between said electrical connector and each of said first and second transducers.

9. A disk drive actuator arm assembly, as claimed in claim 8, wherein:
    said electrical interconnect bus is continuous in that there are no mechanical connections of any type.

10. A disk drive actuator arm assembly, as claimed in claim 1, wherein:
    said first, second, and third flex cable sections are formed on a common sheet of a flexible material with an electrical interconnect bus formed thereon for transferring signals between said electrical connector and each of said first and second transducers.

11. A disk drive actuator arm assembly, as claimed in claim 10, wherein:
    said electrical interconnect bus is continuous in that there are no mechanical connections of any type.

12. A disk drive actuator arm assembly, as claimed in claim 1, further comprising:
    a spacer that is disposed between and interconnects said first and second actuator arms.

13. A drive actuator arm assembly, as claimed in claim 12, wherein:
    said spacer is plastic.

14. A drive actuator arm assembly, as claimed in claim 12, wherein:
    said first actuator arm comprises a first hole that extends between said first actuator arm upper and lower surfaces, wherein said second actuator arm comprises a second hole that extends between said second actuator arm upper and lower surfaces, wherein said spacer comprises a first spacer surface that projects toward said first actuator arm lower surface, a second spacer surface that projects toward said second actuator arm upper surface, a first pin that extends from said first spacer surface and that is disposable through said first hole of said first actuator arm, and a second pin that extends from said second spacer surface and that is disposable through said second hole of said second actuator arm.

15. A disk drive actuator arm assembly, as claimed in claim 14, wherein:
    said first and second pins are configured to provide a detachable interconnection between spacer and each of said first and second actuator arms, respectively.

16. A disk drive actuator arm assembly, as claimed in claim 14, wherein:
    an end of said first and second pins that extend through said first and second holes, respectively, comprises an enlarged head having a diameter that exceeds a diameter of said first, and second holes, respectively.

17. A drive actuator arm assembly, as claimed in claim 12, wherein:
    said first actuator arm comprises a first and second holes that extend between said first actuator arm upper and lower surfaces, wherein said second actuator arm comprises third and fourth holes that extend between said second actuator arm upper and lower surfaces, wherein said spacer comprises a first spacer surface that projects toward said first actuator arm lower surface, a second spacer surface that projects toward said second actuator arm upper surface, first and second pins that extend from said first spacer surface and that are at least disposable within said first and second holes, respectively, of said first actuator arm, and third and fourth pins that extend from said second spacer surface and that are at least disposable within said third and fourth holes of said second actuator arm, wherein there is less clearance between second pin and said second hole than between said first pin and said second hole when said first actuator arm is completely mounted on said spacer, wherein there is less clearance between fourth pin and said fourth hole than between said third pin and said third hole when said second actuator arm is completely mounted on said spacer, wherein said second and fourth pins align said first and second actuator arms, respectively, on said spacer in a predetermined radial position, and wherein said first and third pins detachably interconnect said first and second actuator arms, respectively, with said spacer.

* * * * *